United States Patent [19]
Gleichmar et al.

[11] Patent Number: 5,676,750
[45] Date of Patent: Oct. 14, 1997

[54] PROCESS OF TREATMENT AND ENVIRONMENT-FRIENDLY UTILIZATION OF ASBESTOS-CEMENT PRODUCTS

[75] Inventors: Gert Gleichmar, Günthersleben; Joachim Kieser, Erfurt; Stefan Ambrosius, Berlstedt; Helmut Görmar; Arno Krähner, both of Weimar; Wolf-Joachim Buhrandt, Jena, all of Germany

[73] Assignee: Institut fur Baustoff- und Umweltshcutz-Technologie IBU-tec

[21] Appl. No.: 492,727

[22] Filed: Jun. 20, 1995

[30] Foreign Application Priority Data

Jun. 25, 1994 [DE] Germany ............ 44 23 728.6

[51] Int. Cl.$^6$ ............... C04B 7/52; C04B 18/04
[52] U.S. Cl. .............. 106/745; 106/699; 106/703; 106/757; 588/254
[58] Field of Search ................ 106/699, 703, 106/745, 757; 588/254

[56] References Cited

FOREIGN PATENT DOCUMENTS

| 5458850 | 6/1993 | European Pat. Off. . |
|---|---|---|
| 3728787A1 | 3/1989 | Germany . |
| 4239565 | 5/1994 | Germany . |
| 4312102A1 | 10/1994 | Germany . |
| 4330551 | 3/1995 | Germany . |

OTHER PUBLICATIONS

Kutzer, Hans-Joachim, "Asbestos-Sanierungspsychose?" Warmetechnik Apr. 1993, pp. 193–194.
CA 114:148968, Kavshanskii et al., "Use of Wastes from Asbetos–Cement Manufacture for Manufacturing Portland Cement Clinker," (1990) No Month.
CA 113:45318c, Laszlo et al., "The Use of Asbestos Wastes in Silicate Industry." (1989) No Month.

*Primary Examiner*—Anthony Green
*Attorney, Agent, or Firm*—Fitch, Even, Tabin & Flannery

[57] ABSTRACT

The invention refers to a process of treatment and environment-friendly utilization of asbestos-cement products including a thermal process to transform the asbestos component. Inventively, this is achieved by a coarse reduction of the asbestos-cement products under black side conditions with maintained vacuum. Then, the material is ground to asbestos-cement meal and fed to the flame zone of the rotary kiln of a cement clinker production line. Depending on the fuel type used, the portion of fed asbestos-cement meal varies between 2 and 5%, related to the amount of cement raw meal, substituting 2 to 5% of the cement raw meal mix at a time. The thermal transformation of the asbestos component takes place with temperatures of approximately 1800° C. in the burner zone. The modified residual substance becomes a constituent of the cement clinker due to assimilation in the kiln charge.

10 Claims, No Drawings

PROCESS OF TREATMENT AND ENVIRONMENT-FRIENDLY UTILIZATION OF ASBESTOS-CEMENT PRODUCTS

BACKGROUND OF THE INVENTION

1. Field of the Invention

The invention refers to a process of treatment and environment-friendly utilization of asbestos-cement products including a thermal process to transform the asbestos component.

2. Description of the Prior Art

Asbestos is a hazardous substance contained in a great number of different products. It is nearly completely prohibited to handle these substances except demolition, rehabilitation and maintenance work. The waste yielded is unsatisfactorily settled on dumps according to the state of the art. During the next decades about 30 million tons of asbestos-cement waste to be deposited according to the state of the art will be yielded in Germany alone due to the above work and the end of the lifetime. At present the disposal of asbestos-cement pipes is another unsolved problem insofar as they must be destroyed or their hollow space be filled before settling them on dumps.

In addition to deposit asbestos-cement waste, its disposal on the basis of a chemical or thermal treatment is also known. For instance, a process to eliminate asbestos residues is described in DE-OS 3 728 787. It is distinguished by the transformation of the residues into cement or forsterite in a rotary kiln with approx. 800° C. adding a reaction agent, e.g. phosphoric acid.

DE-OS 4 023 881 describes a process to produce heavy-metal-containing leachproof glasses adding glass-forming substances. In one practical alternative of the invention glass-forming substances are added to the refuse of an incineration plant to be thermally treated making it possible to adjust the calcium, silicon and/or aluminum content in a defined range. The silicon content can be adjusted using sand, precipitated silicic acid and, among others, asbestos, too. The asbestos is absorbed into the inner structure of the glass with temperatures up to 1450° C. and becomes part of the molecular structure. The fibrous structure of the asbestos waste is abolished. This type of glasses can be used, for example, to substitute gravel as building material.

Other thermal processes refer to the feed of asbestos-comprising waste into the melting zone of a metallurgical shaft kiln (DE-OS 4 301 977). Crushed asbestos waste is mixed with pulverized coal, sodium carbonate, calcium fluoride and a water-soluble organic binder. After that it is crushed. The crushed mix is reductively melted in an arc with 1400° C. The material being melted is separately discharged from the melting furnace partly as mineral partly as metallic material. The mineral slag can subsequently be processed to become a raw material suitable for the production of building materials. The metallic material being melted can be used as raw material or aggregate for metallurgical treatment (DE-OS 4 004 201).

A process of thermal treatment of asbestos waste in a rotary kiln is described in DE-OS 4 035 358. The waste is circulated in the rotary kiln and treated during a period of 30 to 70 minutes with about 1100° C. The fibrous asbestos material is predominantly modified into forsterite.

DE-OS 4 227 024 describes how asbestos-containing waste products are put into dustproof containers and then fed into a melting furnace. The fibrous asbestos materials are melted together with a flux below 1000° C. and converted into harmless metal oxides according to DE-OS 3 931 686.

DE-OS 3 914 553 describes the sintering of fibrous structures of chrysotile and crocidolite with simultaneous mechanical influence, the latter not being explained in detail.

It is known from EP 0 568 367 that industrial asbestos refuse becomes part of pellets together with glass, alkali salts or other alkali chlorides and iron or iron salt, and is heated up to 800° C. to 1200° C.

From EP 0 265 051 is known that asbestos is melted in an induction furnace with at least 1250° C., predominantly 1400° C. to 1500° C. The silicate product formed is subsequently reused in the ceramic or glass industry.

The disadvantage of the chemical processes of treatment of asbestos-cement waste is the great number of transports of hazardous substances, i.e. hydrofluoric acid, needed to use the process comprehensively which may cause, in case of accidents, heavy damages to the environment or people. Furthermore, hydrofluoric acid is a very expensive chemical so that these processes have a high cost run-up.

The disadvantage of the thermal processes mentioned is that 85 to 90% of the hydrated cement matrix must be heated up to the decomposition of the asbestos minerals or the formation of melt respectively, in case of vitrification, without existing a causal necessity for this as regards the cement component, when handling asbestos-cement products with an asbestos portion of max. 15%. The high energy expenditure, related to the low portion of asbestos, is unreasonably high.

SUMMARY OF THE INVENTION

The task of the invention is to develop a process of treatment and environment-friendly utilization of asbestos-cement products which is cost-effective, compared with the state of the art, and nearly completely excludes the risk of harmful effects on the environment. Inventively, this is achieved as discussed below, by a coarse reduction of the asbestos-cement products on the black side with maintained vacuum and grinding them in a mill. The asbestos-cement meal obtained is blown into the flame zone of the rotary kiln of the cement clinker production line. Depending on the fuel type used, the portion of the blown-in asbestos-cement meal amounts to 2 to 5%, related to the cement raw meal mix, substituting 2 to 5% of the cement raw meal mix at a time.

DESCRIPTION OF THE PREFERRED EMBODIMENTS

When using ashen solid fuels the maximum limit of the amount of asbestos-cement meal that can be added is 3%. With oil or gas firing the upper limit of the asbestos-cement meal portion is 5%.

Due to the high flame temperatures of 1800° C. the asbestos portions are converted and the thermally modified residual substance becomes a constituent of the cement clinker due to the assimilation in the kiln charge.

The nearly identical chemical composition of the kiln charge and the cement matrix of the asbestos-cement meal thermally treated in the flame zone is advantageous.

When passing the flame zone the lattice structure of the asbestos portion is destroyed by releasing the water of crystallization and, at the same time, new formation of anhydrous magnesium silicates. The fibrous morphology of the asbestos component is completely converted.

The necessary limitation of the MgO content for the production of standard Portland cement, to avoid expansion due to magnesia in the concrete, requires a purposeful incorporation of the asbestos-cement component in the calculation of the specified composition of the raw meal as feed or of the clinker as finished product.

According to the invention, organic constituents, which might be contained in the asbestos cement, can be burnt in quantity when passing the flame and thus be eliminated without any harm.

The advantages of the invention process are that the asbestos-cement products can be utilized cost-effectively and environment-friendly. The product yielded is a high-grade building material without any harmful effects on the environment.

The invention is explained in detail by means of an example.

EXAMPLE

The asbestos-cement products are shredded on the black side with maintained vacuum and afterwards ground in a mill. The produced asbestos-cement meal is fed to the flame zone of the rotary kiln of a production line for Portland cement clinker.

So as to assure the required clinker quality, the raw meal to be sintered with the parameters lime standard I=98 silica modulus=2.8 alumina modulus=1.9 must be kept constant to produce Portland cement clinker in a cement factory.

The raw mix required for this consists of lime stone 87% clay 5% sand 8%.

Adding 2% of asbestos-cement meal as further raw meal component, related to the original raw mix, leads to the substitution of 1% limestone and 1% sand.

Related to a throughput of 2000 t of clinker per day, 70 t of asbestos-cement meal/d can be added.

The MgO content of clinker of e.g. 1.8 ... 2.0%, using normal raw meal, will be increased to approx. 2.0 ... 2.1% adding the above portion of asbestos-cement meal, and is considerably below the limit value of relevant cement standards, i.e. MgO$\leq$5%.

We claim:

1. A process for treating an asbestos cement product which reduces harmful effects on the environment comprising:
   (a) coarse reducing and subsequently grinding the asbestos-cement product under maintained vacuum thereby obtaining a ground asbestos cement meal;
   (b) directly feeding the ground asbestos cement meal obtained in step (a) to a flame zone of a rotary kiln of a cement clinker production line, the flame zone within the rotary kiln being fueled with fuel, and being at a temperature of approximately 1800° C., and said asbestos cement meal being between 2 and 5% of the total amount of cement raw meal mix and asbestos cement meal fed into the rotary kiln; and
   (c) allowing the asbestos cement meal to be thermally modified at a temperature of around 1800° C. in the flame zone of the rotary kiln and to become a constituent of a cement clinker present in the cement clinker production line.

2. The process of claim 1, wherein the asbestos cement product is coarse reduced by crushing.

3. The process of claim 1, wherein the asbestos cement product is coarse reduced by shredding.

4. The process of claim 1, wherein said fuel is solid, and wherein the asbestos cement meal is between 2 and 3% of the total amount of cement raw meal mix and asbestos cement meal fed into the rotary kiln.

5. The process of claim 2, wherein said fuel is solid, and wherein the asbestos cement meal is between 2 and 3% of the total amount of cement raw meal mix and asbestos cement meal fed into the rotary kiln.

6. A process for producing a building material from an asbestos cement product which reduces harmful effects on the environment comprising:
   (a) coarse reducing and subsequently grinding the asbestos cement product under maintained vacuum thereby obtaining a ground asbestos cement meal;
   (b) directly feeding the ground asbestos cement meal obtained in step (a) to a flame zone of a rotary kiln of a cement clinker production line, the flame zone within the rotary kiln being fueled with fuel, and being at a temperature of approximately 1800° C., and said asbestos cement meal being between 2 and 5% of the total amount of cement raw meal mix and asbestos cement meal fed into the rotary kiln; and
   (c) allowing the asbestos cement meal to be thermally modified at a temperature of around 1800° C. in the flame zone of the rotary kiln and to become a constituent of a cement clinker present in the cement clinker production line.

7. The process of claim 6, wherein the asbestos cement product is course reduced by crushing.

8. The process of claim 6, where the asbestos cement product is coarse reduced by shredding.

9. The process of claim 6, wherein said fuel is solid, and wherein the asbestos cement meal is between 2 and 3% of the total amount of cement raw meal mix and asbestos cement meal fed into the rotary kiln.

10. The process of claim 9, wherein said fuel is solid, and wherein the asbestos cement meal is between 2 and 3% of the total amount of cement raw meal mix and asbestos cement meal fed into the rotary kiln.

\* \* \* \* \*